UNITED STATES PATENT OFFICE.

CHESTER L. BRISTOL, OF LORAIN, OHIO, ASSIGNOR TO NATIONAL TUBE COMPANY, A CORPORATION OF OHIO.

CONTROLLER FOR PIPE-DRIFTING AND COUPLING-ATTACHING MACHINES.

1,325,925.   Specification of Letters Patent.   Patented Dec. 23, 1919.

Application filed November 15, 1918. Serial No. 262,736.

*To all whom it may concern:*

Be it known that I, CHESTER L. BRISTOL, a citizen of the United States, residing in Lorain, Ohio, have invented certain new and useful Improvements in Controllers for Pipe-Drifting and Coupling-Attaching Machines, of which the following is a specification.

My invention relates to an automatic controller for drifting machines and particularly to installations wherein a pipe drifting machine operates in conjunction with a coupling attaching machine.

In the manufacture of pipe it is customary to test the completed pipe by passing a test bar known as a "drifting bar" through the pipe to ascertain whether or not there are any obstructions therein, and it is also the practice to screw a coupling on one end of the completed pipe. Heretofore the "drifting" or testing of the pipe and the attaching of the coupling have been accomplished by individual operations with separate and independently operated machines.

The present invention provides means whereby the drifting of the pipe and the attaching of the couplings are accomplished by different machines, the operations of which are governed by an electric controlling apparatus which synchronizes the work of the two machines. With such a controller every pipe to which a coupling is applied must be drifted. With former machines it was quite possible to have a coupling attached to the pipe without drifting the same, the result being that frequently pipes were sent out into stock as perfect which in reality had never been properly drifted. By utilization of the herein described apparatus the pipe must necessarily be drifted at the time that the coupling is applied. It is, therefore, possible to guarantee that each pipe having a coupling secured thereto has been properly drifted and found to be perfect.

One object of the invention is to provide automatic means for controlling the operation of the pipe drifting machine. Another object is to provide means for synchronizing the operation of the drifting machine with that of the coupling attaching machine. A further object is to provide a controller so constructed that the operating motor may be easily started, stopped and reversed without exerting harmful strains thereon. Another object is to construct and organize the different elements described so as to effectively perform the functions set forth.

Figure 1:
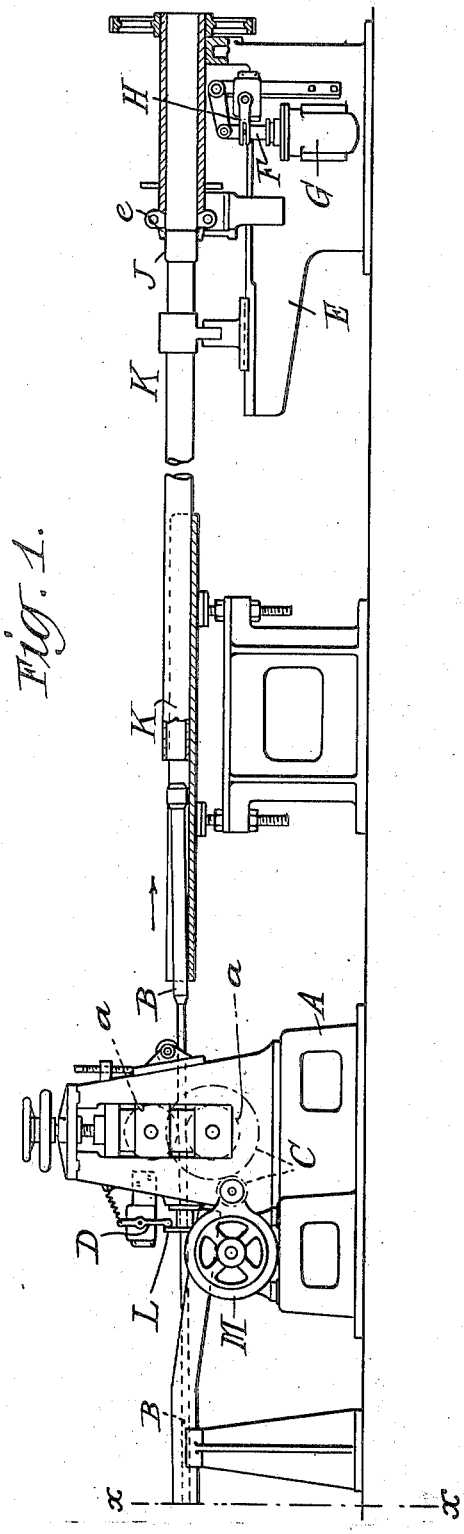
Figure 2:
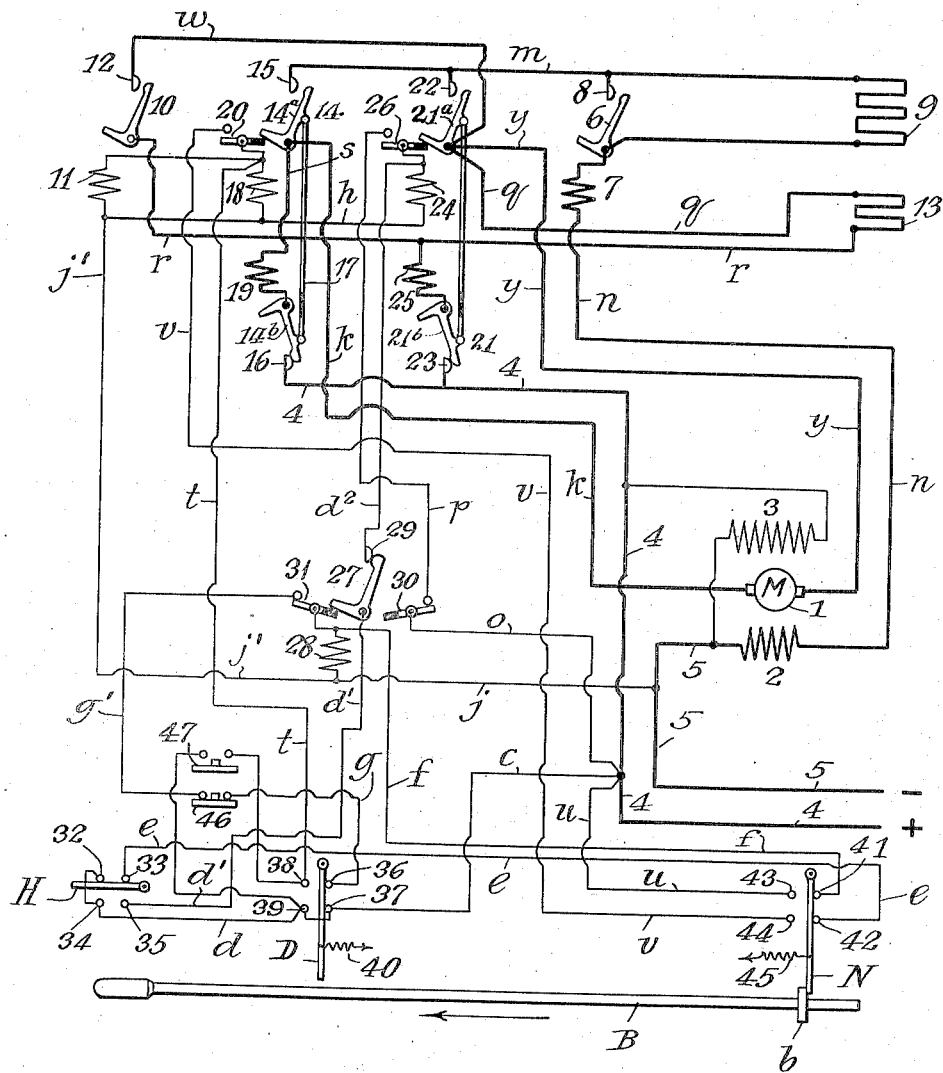

In the drawings, Figures 1 and 1ª when joined on the line $x$—$x$ show a side elevation of a pipe drifting machine and a coupling attaching machine partly broken away arranged in accordance with my invention, the various parts of the automatic controller being shown somewhat diagrammatically;

Fig. 2 is a diagram illustrating the circuits and operating elements of the automatic controller.

In the drawings A represents a known type of drifting machine having driving rolls $a$—$a$ by which the drifting bar B is given a reciprocating motion. The rolls $a$—$a$ are driven through gearing C by a motor M the operation of which is governed by the novel controlling means herein described.

It is customary to supply pipe with a coupling screwed on one end thereof and for economical reasons it is desirable to apply said couplings by machinery. For this purpose I use a coupling attaching machine E of known type which is provided with clamping jaws $e$ of any desired known construction arranged to be operated pneumatically by a plunger F operating in the cylinder G to grip the coupling during the attaching operation, and having similarly operated gripping jaws $g$ by which the pipe is gripped and held against rotation during the coupling attaching and pipe drifting operations.

It is desirable to test or drift the pipe at the same time that the coupling is being applied in order to save time and increase the efficiency of the machine, and to these ends I arrange the controller so that the motor M will be started when the lever of the relay H is rocked by the upward movement of the plunger F as it moves to clamp the jaws $e$ on the coupling J of the pipe K. The motor will drive the drifting bar B into the pipe in the direction of the arrows until the collar $b$ (see Fig. 1ª) strikes the spring pressed buffer L (Fig. 1) and causes it to rock the lever of the relay D which will cause contacts to be made whereby the motor will be stopped and reversed in the manner hereinafter described. When the drifting bar is fully retracted from the pipe the collar b will hold the lever of the relay N in the position shown in Figs. 1ª and 2 to maintain the circuit connections hereinafter described.

Referring to Fig. 2 the numerals 1, 2 and 3 designate respectively the armature, the series and shunt windings of the electric motor M used to drive the pipe-drifting machine and 4 and 5 designate the feed wires from a source of electrical energy. A magnetically operated switch 6 has an operating coil 7 and a contact 8 and is used for short-circuiting resistance 9 to accelerate the motor. A similar switch 10 has operating coil 11 and contact 12 and is used to short circuit a dynamic braking resistance 13 when the motor operates in the reverse direction. A single pole, double throw, magnetically operated switch (designated in a general way by the numeral 14,) having contacts 15 and 16 and having coacting pivoted arms 14ª, 14ᵇ, which are mechanically interlocked and insulated from each other by a link 17, is arranged so that when contact 15 is closed, contact 16 is open, and when contact 16 is closed, contact 15 is open. This switch 14 has an electro-magnetic coil 18 which operates to close contact 15 and a similar coil 19 which operates to hold contact 16 closed, said contact 16 being closed and contact 15 being opened by gravity. An electrical interlock 20 is arranged so that it will close when contact 15 closes and open when said contact opens. A magnetically operated switch (designated generally by the numeral 21) has arms 21ª, 21ᵇ, and contacts 22 and 23, operating coils 24 and 25 and an electrical interlock 26 similar in construction and operation to the switch 14 described above. The magnetically operated switch 27 has an operating coil 28 and contact 29. Two electrical interlocks, 30 and 31 are arranged so that they will close when contact 29 closes and open when contact 29 opens. An inter-locking relay H is arranged to be mechanically operated by the piston of the pneumatic cylinder G that is used to actuate the gripping arms of the coupling attaching machine and is so constructed that when the gripping arms are in the released position, contacts 32 and 33 are closed and contacts 34 and 35 are open, and when the gripping arms are in the gripping position, contacts 34 and 35 are closed and contacts 32 and 33 are open. A reversing relay D is so located that when the drifting bar B is in its idle position, contacts 36 and 37 are closed and contacts 38 and 39 are opened by the action of spring 40 and when the drifting bar B reaches the extreme forward position of the drifting stroke, collar b on the drifting bar will engage with lever of relay D and open contacts 36 and 37 and close contacts 38 and 39. Reset relay N is located near the drifting bar B so that collar b holds contacts 41 and 42 closed and contacts 43 and 44 open against the action of spring 45 when the drifting bar B is in its idle position. When the drifting operation begins, collar b moves away from relay N and spring 45 operates to open contacts 41 and 42 and close contacts 43 and 44. An emergency stop switch 46 and a reverse switch 47 are arranged so that the drifting machine may be stopped at any time during the forward stroke of the drifting bar B and be reversed so as to return the drifting bar to its idle position.

In operation when current is flowing in the line wires 4 and 5 the following circuit is closed +wire 4, c, 37, 39, d, 34, 32, 33, e, 42, 41, f, 28, and j to —line 5, thereby energizing the magnet 28 which closes contact 29 of switch 27, and also the electrical interlocks 30 and 31. When interlock 31 closes, coil 28 has an auxiliary or interlock feed, from +line, 4, c, 37, 36, g, 46, g', 31, 28, j, to —line 5. No other operations of the controller occur until a pipe or tube is ready to be drifted at which time the closing movement of the gripping arms of the coupling attaching machine trips the interlocking relay H so that the contacts 32 and 33 are opened and contacts 34 and 35 are closed. An electrical circuit is thus closed from +line 4, c, 37, 39, d, 34, 35, d', 27, 29, d², 24 wires h j' and j to —line 5. Coil 24 is thereby energized and closes contact 22 and opens contact 23. An electrical circuit is thus established from +line 4, 16, 14ᵇ, 19, s and k, armature 1, y, 21ª, 22, m, 9, 7, n, 2 to —line 5. This starts the motor armature 1 and when it attains the proper speed it is further accelerated by coil 7 closing contact 8 and short-circuiting and starting resistance 9.

Since contact 22 is closed, interlock 26 is closed also and coil 24 has an auxiliary or holding feed from +line 4, wire o, 30, p, 26, 24, wires h, j' and j to —line 5. Since the motor is now running in the forward direction, the drifting bar B moves forward in the direction indicated by the arrow and collar b moves away from reset relay N and the spring 45 opens contacts 41 and 42 and closes contacts 43 and 44. The drifting bar continues to move forward until the collar b engages with the reversing relay D and opens contacts 36 and 37 and closes contacts 38 and 39 against the action of spring 40. When contacts 36 and 37 are opened, the circuit of the interlocking feed to coil 28 is opened and since the original closing feed to coil 28 has been opened at contacts 41 and 42 and also at contacts 32 and 33, switch 27 now opens by gravity thus opening contact 29 and interlocks 30 and 31. This opens the feed to coil 24 and contact 22 opens and contact 23 closes by gravity. Since contacts 16 and 23 are now closed, a dynamic braking circuit is established from 1, $y$, $q$, 13, $r$, 25, $21^b$, 23, 16, $14^b$, 19, $s$, $k$, back to the armature 1 which is thereby brought to rest. When contacts 38 and 39 of the reversing relay D close, a circuit is established from +line 4, wire $c$, 37, 39, 38 wire $t$, to 18 and 11 in parallel and by wires $j'$ and $j$ to —line 5. Coil 18 then operates to close contact 15 and open contact 16. Coil 11 operates to close contact 12 of switch 10 which short circuits the dynamic braking resistance 13 when the motor is running in the reverse direction. When contact 15 closes, interlock 20 closes and since contacts 43 and 44 are closed, coils 18 and 11 have an auxiliary or holding feed from +line, 4, wire $u$, 43, 44, wire $v$, 20, 18 and 11 in parallel and by wires $j'$ and $j$ to —line 5.

Now that contacts 15 and 23 are closed, the motor armature 1 has a feed from +line 4 to contact 23, $21^b$, 25, wire $r$, switch 10, contact 12, $w$, $y$ to $l$, $k$, $14^a$ 15, $m$, 9, 7, $n$, 2 to —line 5. The armature 1 is accelerated in the reverse direction by coil 7 and switch 6 short-circuiting the resistance 9 as previously described. The drifting bar B is now driven in the reverse direction and collar $b$ moves away from reversing relay D, thus allowing spring 40 to open contacts 38 and 39 and close contacts 36 and 37. The drifting bar B continues to move in the reverse direction until collar $b$ engages with reset relay N which opens contacts 43 and 44 and closes contacts 41 and 42 against the action of spring 45. When contacts 43 and 44 are opened, the interlocking or holding feed to coils 18 and 11 are opened and contacts 15 and 12 are opened and contact 16 is closed by gravity and the dynamic brake is applied to armature 1 as described for the forward stroke, thus bringing the armature 1 and drifting bar B to rest.

The above described cycle of operation is completed during the time the coupling is being screwed onto the pipe. When the gripping arms of the coupling attaching machine are released, the interlocking relay H is returned by the movement of the piston F to the position shown in the drawing and since contacts 41 and 42 are now closed, switch 27 closes by action of coil 28 and the apparatus is ready to repeat the above cycle of operation when another pipe or tube is gripped in the coupling attaching machine. If, for any reason, it is desired to stop the motor during the forward stroke and return the drifting bar B to its starting position, as for instance, if there were an obstruction in the pipe, emergency stop switch 46 and reverse switch 47 are provided which, when manually operated, perform the same functions as reversing relay D. Coils 19 and 25 serve to maintain a good connection at contacts 16 and 23 after the latter have been closed by gravity.

While I have described with great particularity the detailed construction and the circuit arrangements of the electrical controller, it is to be understood that changes and the substitution of equivalents may be made by those skilled in the art without departing from the spirit and scope of the invention as defined in the claims.

What I claim is:—

1. In an apparatus of the class described the combination of a pipe drifting machine, a coupling attaching machine, and means whereby the operation of said drifting machine is synchronized with the operation of said coupling attaching machine so that each pipe that has a coupling applied thereto is automatically drifted.

2. In an apparatus of the class described the combination of a pipe drifting machine, a coupling attaching machine, a motor for driving said pipe drifting machine and means for controlling the operation of said motor so that each pipe that has a coupling applied thereto is automatically drifted.

3. In an apparatus of the class described the combination of a pipe drifting machine, a drifting bar actuated thereby, a coupling attaching machine, a motor for driving said pipe drifting machine and means comprising a plurality of relays arranged to coact with said drifting bar and a plurality of magnetically operated switches controlled by said relays and arranged to control circuits whereby the motor is started, stopped and reversed substantially as described.

4. In an apparatus of the class described the combination of a pipe drifting machine, a drifting bar actuated thereby, a coupling attaching machine, a motor for driving said pipe drifting machine, a source of electrical energy, an interlocking relay arranged to be actuated by said coupling attaching machine, means associated with said interlocking relay whereby upon the actuation thereof the motor will be started to drive said drifting bar through the pipe, a reversing relay arranged to be actuated by said drifting bar upon the completion of its drifting stroke and means associated with said reversing relay whereby upon the actuation thereof the motor will be stopped and reversed to withdraw the drifting bar from the pipe.

5. In an apparatus of the class described the combination of a pipe drifting machine, a coupling attaching machine, a motor for driving said pipe drifting machine, a source of electrical energy, an interlocking relay arranged to be actuated by said coupling attaching machine, a magnetically operated switch controlled by said interlocking relay and arranged to close a circuit through the motor which will cause it to drive the drifting bar forward, and a reversing relay actuated by the drifting bar and arranged to control circuits whereby the motor will be stopped and its direction reversed to withdraw the drifting bar from the pipe.

6. In an apparatus of the class described the combination of a pipe drifting machine, a coupling attaching machine, a motor for driving said pipe drifting machine, a source of electrical energy, an interlocking relay arranged to be actuated by said coupling attaching machine, a magnetically operated switch controlled by said interlocking relay and arranged to close a circuit through the motor which will cause it to drive the drifting bar forward, and a reversing relay actuated by the drifting bar arranged to control circuits whereby the motor will be stopped and its direction reversed to withdraw the drifting bar from the pipe, and means whereby the various switches will be reset to their original positions upon the withdrawal of the drifting bar.

7. In an apparatus of the class described the combination of a pipe drifting machine, a drifting bar actuated thereby, a coupling attaching machine, a motor for said pipe drifting machine, a source of electrical energy, resistances in circuit therewith, a plurality of electro-magnetically operated switches arranged in circuits with said motor and resistances to start, accelerate and reverse the motor at intervals determined by the position of the drifting bar, an interlocking relay actuated by the coupling attaching machine, a reversing relay and a reset relay arranged to coact with said drifting bar, said relays being arranged to control circuits for actuating the above mentioned electro-magnetic switches.

8. In an apparatus of the class described the combination of a pipe drifting machine, a drifting bar actuated thereby, a coupling attaching machine, a motor for said pipe drifting machine, a source of electrical energy, resistances in circuit therewith, a plurality of electro-magnetically operated switches arranged in circuits with said motor and resistances to start, accelerate and reverse the motor at intervals determined by the position of the drifting bar, interlocks actuated by said electro-magnetic switches for establishing auxiliary holding circuits for the magnets of said switches, an interlocking relay, actuated by the coupling attaching machine, a reversing relay and a reset relay arranged to coact with said drifting bar, said relays being arranged to control circuits for actuating the above mentioned electro-magnetic switches.

9. In an apparatus of the class described the combination of a pipe drifting machine, a drifting bar actuated thereby, a coupling attaching machine and a motor for driving said pipe drifting machine, a source of electrical energy, an interlocking relay H arranged to be operated by the coupling attaching machine, a reversing relay D actuated by the drifting bar, switches 21 and 27 for controlling circuits whereby the motor is rotated in one direction, electro-magnets 24 and 28 for actuating said switches, one of said magnets (24) being in a circuit controlled by said interlocking relay when said switch 27 is closed and the other magnet (28) being in a circuit controlled by said reversing relay D, a switch 14 arranged in a circuit for reversing the direction of the motor, an electro-magnet 18 for actuating said switch, said magnet being in a circuit arranged to be closed by the reversing relay upon the completion of the forward stroke of the drifting bar, a switch 20 actuated by the switch 14 and arranged to hold the circuit of said magnet 18 closed after the reversing relay has moved to break the initial energizing circuit to said magnet, a reset relay N arranged in circuit with the interlocking relay H, the operating magnet 18, and the magnet 28 in such a manner that upon the completion of the withdrawal stroke of the drifting bar the various magnetic switches will be restored to their original positions for the next cycle of operations.

10. In combination, pipe drifting mechanism and coupling attaching mechanism, one of said mechanisms controlling the other to insure the operation of both on the same pipe.

In witness whereof I have hereunto signed my name.

CHESTER L. BRISTOL.